July 22, 1969   J. G. VIENE   3,456,776
BELT CONVEYOR FOR SANITARY FOOD CONVEYING
Filed Oct. 26, 1967
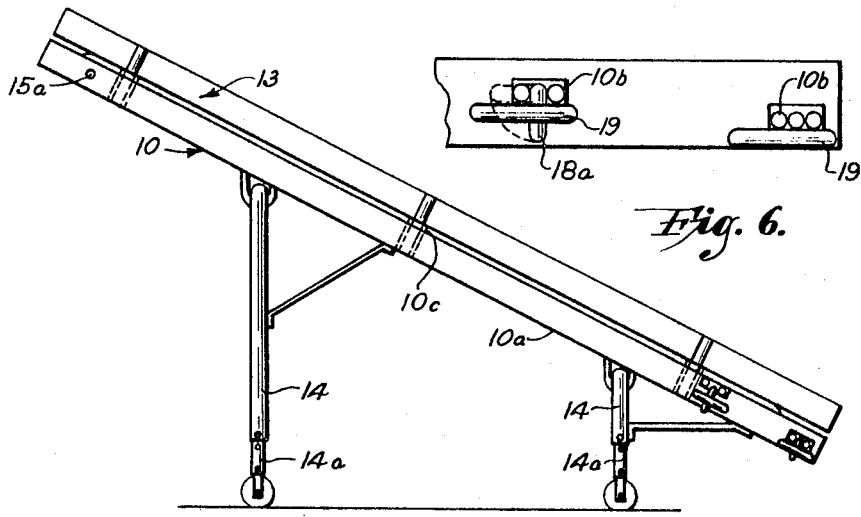
Fig. 6.
Fig. 1.
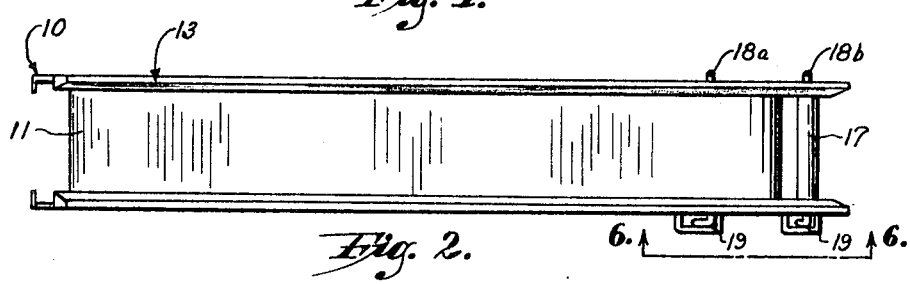
Fig. 2.
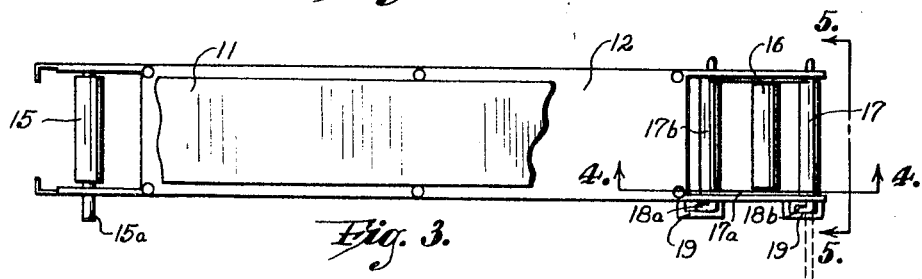
Fig. 3.
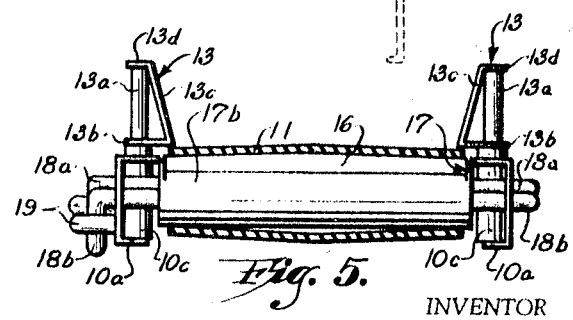
Fig. 5.
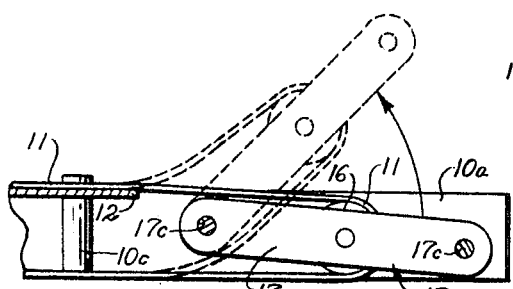
Fig. 4.
INVENTOR
John G. Viene
BY
Scofield, Hokjer, Scofield & Lowe
ATTORNEYS

United States Patent Office 3,456,776
Patented July 22, 1969

3,456,776
BELT CONVEYOR FOR SANITARY FOOD CONVEYING
John G. Viene, Shawnee Mission, Kans., assignor to Koch Supplier, Inc., a corporation of Missouri
Filed Oct. 26, 1967, Ser. No. 678,256
Int. Cl. B65g 15/30
U.S. Cl. 198—208           8 Claims

ABSTRACT OF THE DISCLOSURE

A belt conveyor wherein the tail pulley is rotatably mounted between lateral support members, said support members pivotally attached to the side walls of the conveyor. Pivotal motion of the support members away from a first belt extended position relaxes the tension in the belt such that in the belt slack condition, access to the underside of the belt and its adjacent support means is made available. This feature is especially desirable for the thorough cleaning of food handling conveyors. Releasable locking means are included to restrain pivotal motion of the support members in the belt extended position. Removable side wall extensions are also included, each having a lateral guiding surface overhanging the lateral edge of the belt and in nearby relationship thereto. The overhanging guiding surface prevents conveyed material from slipping off the side of the belt and subsequently lodging thereunder or in the corners or crevices along the interior lateral perimeter of the conveyor. The side wall extensions are removed to permit pivoting the tail pulley assembly.

Background of the invention

This invention relates to a belt conveyor having unique features rendering it especially well suited for the sanitary handling of food products. Heretofore it has been a major problem in food handling belt conveyors to clean the slider plate over which the belt rides and also to clean the underside of the belt. In order to remove the belt tension sufficiently to get at these normally inaccessible areas, it was necessary to remove or loosen a set of nuts or bolts, slide either the head or tail pulley forward, and then clean the newly accessible belt and slider plate areas. Following the cleaning operation, the reverse of the previous cycle was repeated and the belt retensioned. In many instances the belt would not be properly retensioned after cleaning, and as a result would slip on the drive pulley causing jerking rather than smooth belt advancement. When this happened, the nuts or bolts had to be reloosened, the tension adjusted a second time, and another test run made. As can be seen, this was an unsatisfactory procedure and was oftentimes too time consuming for routine cleaning operations.

The invention described herein involves a substantial improvement over the above method of releasing the tension on the conveyor belt in an amount adequate for access to the slider plate and the underside of the belt. Furthermore, the tail pulley is automatically always returned to the same operable position, thereby eliminating any problems with proper retensioning. Considerable time is saved in thoroughly cleaning the conveyor which encourages more frequent cleaning operations. More sanitary conditions are thereby maintained and the food handler is better able to supply the consumer with an uncontaminated product.

Summary of the invention

This invention includes a belt conveyor wherein the tail pulley is mounted within a pivotal framework and includes removable side rails with a unique guide feature for minimizing even relatively small particles from slipping off the side of the belt. A means for restricting pivotal motion of the pivotal framework is also included.

An object of the invention is to provide an extremely fast and simple means for reducing the tension of a belt in a conventional belt type conveyor so as to provide access to the slider plate of said conveyor and the underside of said belt.

A further object of this invention is to provide a means for removing the tension from a belt of a conventional belt type conveyor wherein said belt can be returned to its previous tensioned position without requiring detailed and time consuming pulley adjustments.

Still another object of this invention is to provide a means for restricting the pivotal motion of said tail pulley wherein said restricting means can be quickly and simply released.

Still another object of this invention is to provide a belt conveyor with removable side rails, said rails having a guiding feature that minimizes even small particles slipping off the side of the belt, sticking to the slider plate or the under side of the belt and thus creating an unsanitary condition.

Still a further object of this invention is to provide a belt conveyor with an extremely quick and simple means for adjusting belt tension.

In the accompanying drawing which forms a part of the instant specification and is to be read in conjunction therewith:

FIG. 1 shows an elevational profile of the typical belt type conveyor;

FIG. 2 is a plan view of the conveyor;

FIG. 3 is a plan view like FIG. 2, but with the side rail extensions removed and portions of the belt eliminated for viewing the head pulley and the pivotal tail pulley assembly;

FIG. 4 is a partial sectional view through line 4—4 of FIG. 3 in the direction of the arrows and showing the pivotal assembly;

FIG. 5 is a greatly expanded end view along line 5—5 of FIG. 3 in the direction of the arrows, the belt shown in section; and FIG. 6 is a greatly expanded side view of the tail portion of the conveyor and with the side rail extensions removed.

Turning now to the drawing in detail, the belt type conveyor as shown in the figures is comprised of an elongate frame 10 having lateral side walls 10a and containing a pulley driven belt 11. In the embodiment shown, the load supporting portion of the belt 11 rests upon a flat rigid metal slider plate 12 bridging between the conveyor side walls, but may also rest on other support features such as laterally extending rollers or a structural framework. Removable side wall extensions 13 are included, to be described in more detail later, and the entire framework is mounted upon wheel supported legs 14. These legs have telescoping extensions 14a which permit adjustment of the height and angle of the conveyor.

At the forward end of the conveyor is a rotatably mounted head pulley 15 which provides the driving force for the belt. The power supply for the head pulley (not shown here for simplicity) normally includes an electric motor either directly or indirectly connected to the head pulley shaft 15a. Near the rearward end of the conveyor is the tail pulley 16 as shown in FIGS. 3, 4 and 5. In the conventional conveyor this pulley would be mounted in the conveyor in a manner almost identical to the mounting of the head pulley. However, this invention involves a unique pivotal mounting arrangement which permits pivoting the tail pulley about a remote axis to obtain slack in the conveyor belt.

The tail pulley 16 is rotatably mounted between side rails 17a of a substantially rectangular frame 17. The end members 17b of this frame are cylindrical in shape with an axially located bore 17c extending therethrough and continuing through the side rails 17a. The pivotal frame 17 fits between the side walls 10a of the conveyor as shown in FIGS. 4 and 5, and is mounted therebetween by the insertion of rod type pins 18a and 18b that pass through circular apertures 10b in the conveyor side walls 10a and through the bores 17c in the pivotal frame.

It can be seen, particularly in FIGS. 1 and 6, that a plurality of apertures are included in the side walls 10a of the conveyor. In the embodiment shown, each side wall has two sets of three apertures each, spaced such that the front and rear bores 17c in the frame 17 can be aligned with any of the three pairs of corresponding apertures in the conveyor side walls. A quick means of adjusting operative tension on the belt is thereby provided, since the distance between the head and tail pulleys, and consequently the tension in the belt, will depend upon which set of apertures 10b in the conveyor side walls are used. It is manifest that if a greater latitude in the adjustment is desired, additional apertures can be incorporated with spacing between individual apertures dependent upon the degree of refinement in the adjustability desired.

In FIG. 4, it can be seen that the front pin 18a which serves as the pivotal axis, passes through the loop formed by the belt 11. Although it is not essential that the pivotal pin pass through the loop, it is essential that it be positioned ahead of the tail pulley axis 16a so that pivotal motion can produce slack in the belt.

In the embodiment shown, the pins are shown passing completely through both side walls of the conveyor and extending outwardly from either edge. One end portion of each of the pins 18a and 18b is bent at a right angle to provide a stop means preventing the pin from passing on through the aperture, and also to provide a means for preventing unintentional displacement of the pins, as will be described later. Rigid bails 19 project from one exterior side wall 10a of the conveyor frame, and are positioned immediately below the pin accepting apertures 10b. In the embodiment shown, these bails are parallel with the longitudinal axis of the conveyor.

The side wall extensions 13, mentioned previously, are rigidly mounted on a plurality of vertical rods 13a, the lower depending portion of which can be removably inserted into tubular sleeves 10c along the lateral perimeter of the conveyor. The configuration of each of the extensions includes a lower inwardly directed base portion 13b, as shown in FIG. 5, that rests on the upper end of the rod accepting sleeves. This base portion projects inwardly to just beyond the edge of the conveyor belt 11 so that it slightly overhangs the belt. The clearance between the base portion 13b and the belt 11 is sufficient to prevent contact with the belt, but is close enough to prevent even relatively small particles from slipping under the projection 13b and off the side of the belt 11. The lateral walls 13c of the extensions are angularly joined to the overhanging edge of the base portion 13b and slope upwardly and outwardly to the perimeter of the rod supports 13a. An upper flange 13d extends over the rods 13a and is rigidly attached thereto.

The pivotal framework 17 of the tail pulley 16 is mounted between the side walls 10a of the conveyor by insertion of the pins 18a and 18b through the apertures 10b in the side walls 10a and through the axial bores 17c in the pivotal frame. When the right angle portion of each pin 18 abuts or nearly abuts the side wall 10a of the conveyor, it is rotated into transverse alignment with the bail 19. The broken line representation of FIG. 3 shows the approximate orientation of the pin during insertion and the solid line representation shows orientation of the pin when restrained by the bail. Thus the pin cannot be accidentally withdrawn until rotated sufficiently to clear the bail. Following insertion of the pins, the removable side wall extensions 13 can be installed by simply slipping the depending ends of the support rods 13a into the sleeves 10b on the conveyor. When thus installed, the conveyor belt 11 peripherally engages the tail pulley 16 and also encompasses the front pin 18a within its loop. When the rear pin 18b is withdrawn, as illustrated in the broken line representation of FIG. 3, and the side wall extensions 13 removed from the conveyor, the tail pulley 16 can be pivoted about the front pin 18a as shown in FIG. 4. Substantial slack is thereby produced in the conveyor belt 11. In the slack condition, the belt can be lifted away from the slider plate 12 for cleaning the underside of the belt and the slider plate or other routine maintenance procedure. When the maintenance is completed, the pivotal assembly is pivoted back in place until the pin accepting apertures 10b in the conveyor walls register with the bore 17c in the pivotal frame and there locked in place by insertion of the pin 18b. No tensioning adjustments would normally be required since the tail pulley 16 is always returned to the same position as prior to slacking the belt 11. However, if the belt is found to be too loose or too tight, it is a simple matter to remove both pins and reinsert them in the side wall apertures 10b to the left or right of their former location dependent upon whether loosening or tightening is desired. The side wall extensions 13 can finally be reinstalled as before and the conveyor assembly is completed.

The cleaning operation just described is extremely simple and takes a minimum of time. Certainly it is a vast improvement over the prior method as described previously.

Since food items such as meat products tend to shed scraps which cling to the slider plate and the underside of the belt, an extremely unsanitary condition is created unless the conveyor is thoroughly cleaned routinely. Even though the overhanging portion of the side wall extensions 13 prevent most of the scrap particles from slipping off the belt 11, some scraps still manage to slip beneath the extensions and lodge between the belt and the slider plate 12. The simplicity by which these areas can be reached for cleaning undoubtedly encourages more frequent cleaning operations, and thereby provides more sanitary food handling conditions. The food handler is benefited by making his cleaning operations simpler, and the consumer public is benefited by receiving a more sanitary product.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:
1. A belt conveyor comprising
   a rigid framework, lateral side walls thereon,
   a slider plate supported between said side walls,
   a head pulley at the forward end and a tail pulley at the rearward end of said conveyor,
   a continuous belt forming a loop peripherally engaging said pulleys and longitudinally encompassing said slider plate,
   tail pulley support members on both sides of said tail pulley, said members pivotally attached to and located between said conveyor side walls near the rearward end thereof and forward of the axis of said tail pulley,
   said tail pulley rotatably mounted between and supported by said support members, and releasable locking means for locking said members in a first, belt extended position for said tail pulley and, when released, permitting swinging of said support members to a second belt slack position for said tail pulley.

2. A belt conveyor as claimed in claim 1 wherein said releasable locking means for locking said support in a first belt extended position contains a pin removably inserted through aligning apertures in said conveyor side walls and said pulley support members.

3. A belt conveyor as claimed in claim 1 wherein said conveyor side walls and said pulley support members have aligned openings therethrough and wherein said pulley support members locking means is comprised of a pin having one end portion angularly bent, said pin removably inserted into said openings, the angular end portion of said pin, while inserted, adjacent the outer face of one of said conveyor side walls, a rigid bail fixedly attached to said one conveyor side wall and laterally projecting therefrom in nearby relationship to the angular portion of said pin, said pin rotatable to bring into restraining alignment with said bail thereby releasably restraining withdrawal of said pin.

4. A belt conveyor as claimed in claim 1 wherein the pivotal attachment between said pulley support members and said conveyor side walls is comprised of a shaft communicating between said side walls and through said support members.

5. A belt conveyor as claimed in claim 3 wherein said shaft communicating between said pulley support members and said conveyor side walls is a removable pin having an angularly bent end portion, said conveyor side walls and said pulley support members having aligning openings therethrough into which said pin is inserted with the angularly bent end portion adjacent the outside face of one of said conveyor side walls, a rigid bail fixedly attached and laterally projecting from said one conveyor side wall and in nearby relationship to the bent portion of said pin, said pin rotatable to bring the bent portion into restraining alignment with said bail thereby releasably preventing withdrawal of said pin.

6. A belt conveyor as claimed in claim 1 wherein said releasable locking means and said pivotal attachment are each comprised of a pin removably inserted through aligned apertures in said conveyor side walls and said pulley support members, said conveyor side walls having a plurality of apertures therein spaced along the longitudinal direction of the conveyor thereby enabling loosening of the tension of said conveyor belt by moving said pins to corresponding openings in the conveyor side walls forward from their former position and tightening of the tension of said conveyor belt by moving said pins to corresponding openings in the conveyor side walls rearward from their former position.

7. In a belt conveyor as claimed in claim 1, removable side wall extensions, said extensions each having a lateral guiding surface, the lower edge of which slightly overhangs the adjacent lateral edge of said conveyor belt in nearby relationship thereto, said extensions removable for pivoting said pulley support member portion.

8. In a belt conveyor as claimed in claim 5, removable side rail extensions, said extensions each having an inwardly projecting base portion, said portion overhanging the adjacent lateral edge of said conveyor belt and in nearby relationship thereto, mounting rods perpendicular to said base portion and extending in either direction therefrom, side plates attached to the inner edge of said base portion and extending along the lateral perimeter of said conveyor, said belt conveyor having tubular sleeves rigidly mounted along the lateral perimeter thereof, the lower depending portion of said mounting rods removably inserted into said sleeves for mounting said wall extensions on said conveyor, said extensions removable to permit pivoting said pulley support members.

References Cited

UNITED STATES PATENTS

| | | | |
|---|---|---|---|
| 956,093 | 4/1910 | Hildebrand | 198—113 |
| 1,031,850 | 7/1912 | Harpstrite | 198—113 |
| 1,989,537 | 1/1935 | Wentz | 198—204 |

RICHARD E. AEGERTER, Primary Examiner